United States Patent
Lee et al.

(10) Patent No.: US 11,467,691 B2
(45) Date of Patent: Oct. 11, 2022

(54) TOUCH DISPLAY DEVICE

(71) Applicant: LG DISPLAY CO., LTD., Seoul (KR)

(72) Inventors: Jae-Won Lee, Goyang-si (KR); Min-Joo Kim, Seoul (KR); Sang-Hyuk Won, Gimpo-si (KR); Jae-Hyung Jang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/544,593

(22) Filed: Dec. 7, 2021

(65) Prior Publication Data

US 2022/0091719 A1    Mar. 24, 2022

Related U.S. Application Data

(63) Continuation of application No. 17/103,936, filed on Nov. 24, 2020, now Pat. No. 11,226,702.

(30) Foreign Application Priority Data

Dec. 30, 2019 (KR) .......................... 10-2019-0178306

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05)

(58) Field of Classification Search
CPC ... G06F 3/04164; G06F 3/0412; G06F 3/0446
USPC .......................................................... 345/156
See application file for complete search history.

(56) References Cited

U.S. PATENT DOCUMENTS

| | | | |
|---|---|---|---|
| 9,276,055 B1* | 3/2016 | Son ...................... | H01L 27/323 |
| 2016/0099299 A1* | 4/2016 | Chung .............. | H01L 29/41733 257/40 |
| 2018/0033980 A1* | 2/2018 | Park .................... | G06F 3/04164 |
| 2018/0151662 A1* | 5/2018 | Rhe ...................... | G06F 3/0412 |
| 2018/0269261 A1* | 9/2018 | Park ...................... | G06F 3/044 |
| 2018/0286937 A1* | 10/2018 | Choi ..................... | G06F 3/0412 |

FOREIGN PATENT DOCUMENTS

KR    10-2018-0059633 A    6/2018

* cited by examiner

*Primary Examiner* — Mark Edwards
(74) *Attorney, Agent, or Firm* — Polsinelli PC

(57) ABSTRACT

A touch display device for preventing deterioration in image quality is structured such that a plurality of touch sensors is disposed on an encapsulation unit encapsulating a light-emitting element and includes a driving signal line, which includes a first driving signal line disposed below the encapsulation unit and a second driving signal line disposed above the encapsulation unit so as to be in contact with the first driving signal line to reduce line resistance of the driving signal line, thereby preventing deterioration in image quality.

9 Claims, 15 Drawing Sheets

TOUCH DISPLAY DEVICE

CROSS-REFERENCE TO RELATED APPLICATION

This application is a continuation of U.S. patent application Ser. No. 17/103,936, filed on Nov. 24, 2020, which claims the benefit of Korean Patent Application No. 10-2019-0178306, filed on Dec. 30, 2019, which are hereby incorporated by reference in their entirety.

BACKGROUND

Field of the Disclosure

The present disclosure relates to a touch display device, and more particularly to a touch display device for preventing deterioration in image quality.

Description of the Background

A touch screen is an input device through which a user may input a command by selecting instructions displayed on a screen of a display device using a hand or an object. That is, a touch screen converts a contact position that directly contacts a human hand or an object into an electrical signal and receives selected instructions based on the contact position as an input signal. Such a touch screen may substitute for a separate input device that is connected to a display device and operated, such as a keyboard or a mouse, and thus the range of application of the touch screen is continually increasing.

Recently, research and development have been actively conducted on touch display devices, in which a touch screen is disposed on a display panel such as a liquid crystal display panel or an organic electroluminescent display panel. As touch display devices have become higher in resolution and larger in size, an RC delay of a driving signal, attributable to a line resistor (R) and a capacitor (C) in each signal line, has increased. Thus, there is a problem in that variation in luminance occurs due to variation in the delay of each driving signal depending on the position of each subpixel.

SUMMARY

Accordingly, the present disclosure is directed to a touch display device that substantially obviates one or more problems due to limitations and disadvantages of the prior art.

More specifically, the present disclosure provides a touch display device for preventing deterioration in image quality.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve the above and other advantages and in accordance with the purpose of the disclosure, as embodied and broadly described herein, a touch display device is structured such that a plurality of touch sensors is disposed on an encapsulation unit encapsulating a light-emitting element. The touch display device includes a driving signal line, which includes a first driving signal line disposed below the encapsulation unit and a second driving signal line disposed above the encapsulation unit so as to be in contact with the first driving signal line.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure.

In the drawings.

DETAILED DESCRIPTION

Reference will now be made in detail to exemplary aspects of the present disclosure, examples of which are illustrated in the accompanying drawings.

Figure 1:
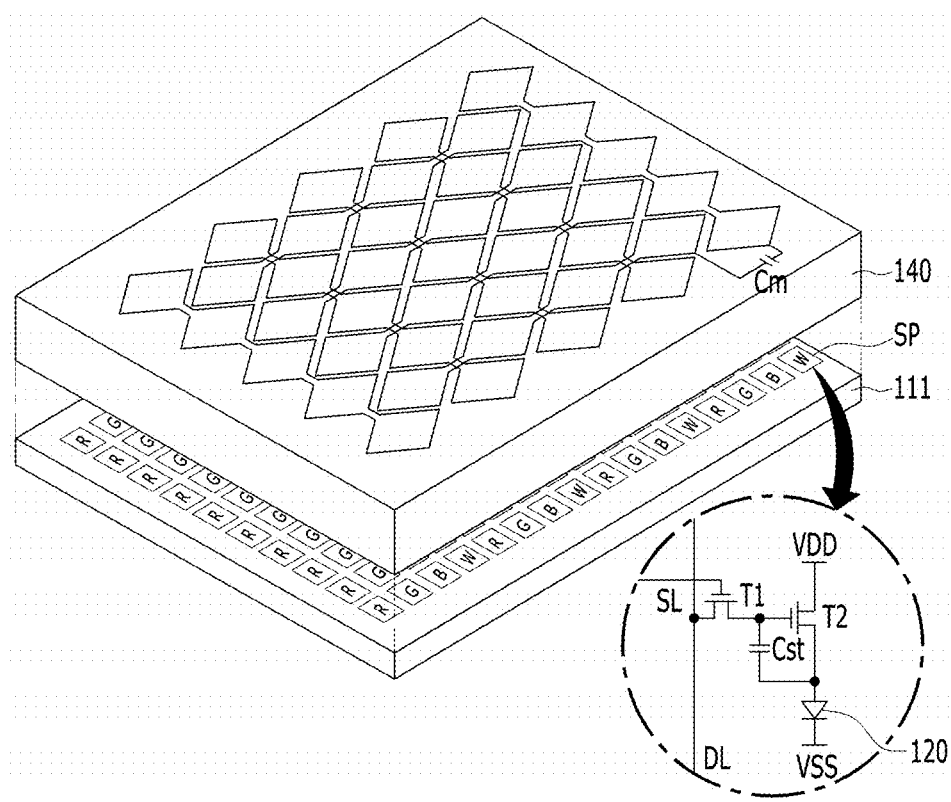
FIG. 1 is a perspective view showing a touch display device according to the present disclosure.

FIG. 1 is a perspective view showing a touch display device according to the present disclosure.

Figure 2:
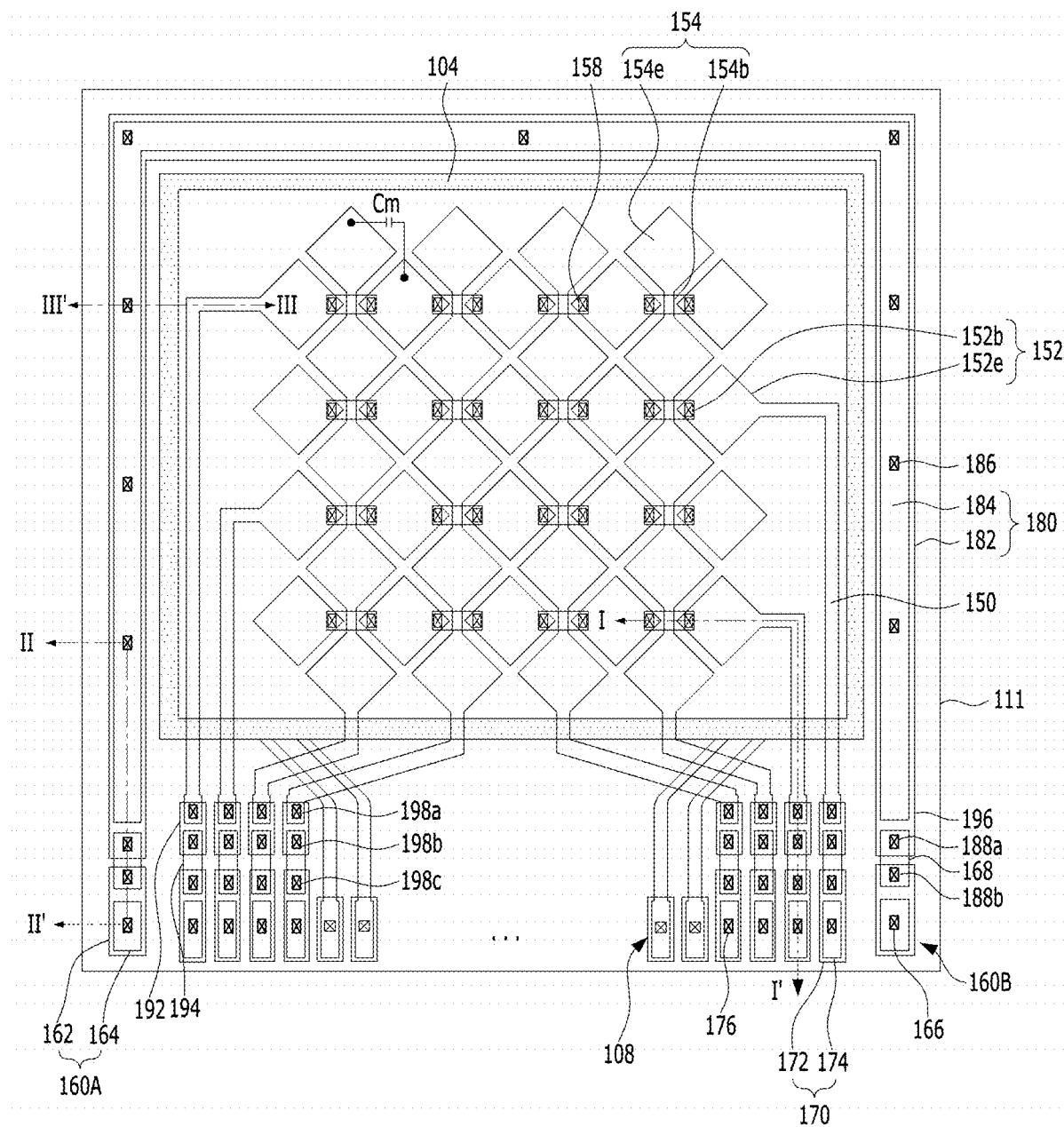
FIG. 2 is a plan view showing a touch display device according to a first aspect of the present disclosure.

A touch display device shown in FIG. 1 senses the presence or absence of a touch and a touch position by sensing variation in mutual capacitance Cm (a touch sensor) in response to a user touch through touch electrodes 152$e$ and 154$e$ shown in FIG. 2 for a touch period. The touch display device shown in FIG. 1 displays an image through a unit pixel including a light-emitting element 120.

To this end, the touch display device includes a unit pixel composed of a plurality of subpixels SP arranged in a matrix form on a substrate 111, an encapsulation unit 140 disposed on the plurality of subpixels SP, and a touch sensor Cm disposed on the encapsulation unit 140.

The unit pixel is composed of red (R), green (G) and blue (B) subpixels SP, which are arranged in a row. Alternatively, as shown in FIG. 1, the unit pixel is composed of red (R), green (G), blue (B) and white (W) subpixels SP.

Each of the subpixels SP includes a pixel-driving circuit and a light-emitting element 120 connected to the pixel-driving circuit.

The pixel-driving circuit includes a switching transistor T1, a driving transistor T2, and a storage capacitor Cst. In the present disclosure, a structure in which the pixel-driving circuit includes two transistors T and one capacitor C is described by way of example, but the present disclosure is not limited thereto. That is, a pixel-driving circuit having a 3T1C structure or 3T2C structure in which three or more transistors T and one or more capacitors C are provided may be used.

The switching transistor T1 is turned on when a scan pulse is supplied to a scan line SL, and supplies a data signal supplied to a data line DL to the storage capacitor Cst and a gate electrode of the driving transistor T2.

The driving transistor T2 controls the current supplied from a high-voltage (VDD) supply line to the light-emitting element 120 in response to the data signal supplied to the gate electrode of the driving transistor T2, thereby adjusting the amount of light emitted from the light-emitting element 120. Even when the switching transistor T1 is turned off, the driving transistor T2 maintains the emission of light by the light-emitting element 120 by supplying a constant amount of current thereto using the voltage charged in the storage capacitor Cst until the data signal of the next frame is supplied.

Figure 3:
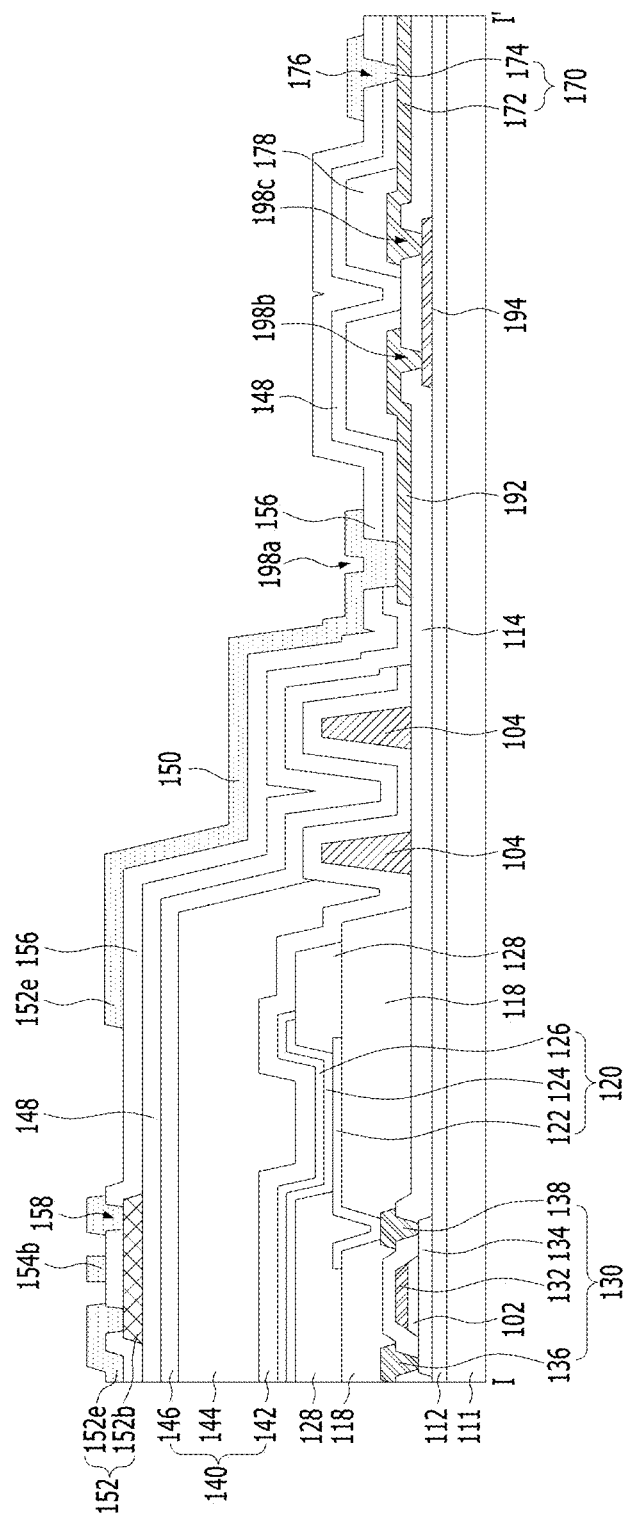
FIG. 3 is a cross-sectional view of the touch display device taken along line I-I' in FIG. 2.

The driving transistor T2 (130), as shown in FIG. 3, includes a semiconductor layer 134 disposed on a buffer layer 112, a gate electrode 132 overlapping the semiconductor layer 134 with a gate insulating film 102 interposed therebetween, and source and drain electrodes 136 and 138 formed on an interlayer insulating film 114 so as to be in contact with the semiconductor layer 134. The semiconductor layer 134 is formed of at least one of an amorphous semiconductor material, a polycrystalline semiconductor material, and an oxide semiconductor material.

The light-emitting element 120 includes an anode 122, a light-emitting stack 124 formed on the anode 122, and a cathode 126 formed on the light-emitting stack 124.

The anode 122 is electrically connected to the drain electrode 138 of the driving transistor T2 (130), which is exposed through a pixel contact hole that penetrates a pixel planarization layer 118.

At least one light-emitting stack 124 is formed on the anode 122 in an emission area that is defined by a bank 128. The at least one light-emitting stack 124 is formed by stacking a hole-related layer, an organic emission layer, and an electron-related layer on the anode 122 in that order or in the reverse order. In addition, the light-emitting stack 124 may include first and second light-emitting stacks, which face each other with a charge generation layer interposed therebetween. In this case, the organic emission layer of any one of the first and second light-emitting stacks generates blue light, and the organic emission layer of the other one of the first and second light-emitting stacks generates yellow-green light, whereby white light is generated through the first and second light-emitting stacks. Since the white light generated in the light-emitting stack 124 is incident on a color filter located above the light-emitting stack 124, a color image may be realized. Alternatively, colored light corresponding to each subpixel may be generated in each light-emitting stack 124 without a separate color filter in order to realize a color image. That is, the light-emitting stack 124 of the red (R) subpixel may generate red light, the light-emitting stack 124 of the green (G) subpixel may generate green light, and the light-emitting stack 124 of the blue (B) subpixel may generate blue light.

The cathode 126 is formed so as to face the anode 122, with the light-emitting stack 124 interposed therebetween. The cathode 126 is connected to a low-voltage (VSS) supply line.

The encapsulation unit 140 prevents external moisture or oxygen from entering the light-emitting element 120, which is vulnerable to external moisture or oxygen. To this end, the encapsulation unit 140 includes a plurality of inorganic encapsulation layers 142 and 146 and an organic encapsulation layer 144 disposed between the plurality of inorganic encapsulation layers 142 and 146. The inorganic encapsulation layer 146 is disposed at the top of the encapsulation unit 140. In this case, the encapsulation unit 140 includes at least two inorganic encapsulation layers 142 and 146 and at least one organic encapsulation layer 144. In the present disclosure, the structure of the encapsulation unit 140 in which the organic encapsulation layer 144 is disposed between the first and second inorganic encapsulation layers 142 and 146 will be described by way of example.

The first inorganic encapsulation layer 142 is formed on the substrate 111, on which the cathode 126 has been formed, at the position that is the closest to the light-emitting element 120. The first inorganic encapsulation layer 142 is formed of an inorganic insulating material that is capable of being deposited at a low temperature, such as silicon nitride (SiNx), silicon oxide (SiOx), silicon oxynitride (SiON), or aluminum oxide (Al2O3). Thus, since the first inorganic encapsulation layer 142 is deposited in a low-temperature atmosphere, it is possible to prevent damage to the light-emitting stack 124, which is vulnerable to a high-temperature atmosphere, during the process of depositing the first inorganic encapsulation layer 142.

The organic encapsulation layer 144 serves to dampen the stress between the respective layers due to bending of the organic light-emitting display device and to increase planarization performance. The organic encapsulation layer 144 is formed of an organic insulating material, such as acrylic resin, epoxy resin, polyimide, polyethylene, or silicon oxycarbide (SiOC).

When the organic encapsulation layer 144 is formed through an inkjet method, at least one dam 104 is disposed in order to prevent the organic encapsulation layer 144, which is in a liquid state, from spreading to an edge of the substrate 111. The at least one dam 104 may prevent the organic encapsulation layer 144 from spreading to a pad area formed at the outermost portion of the substrate 111, in which power pad (including power pads 160A and 160B), a touch pad 170 and a display pad 108 are disposed. To this end, the at least one dam 104 may be formed so as to completely surround the active area, in which the light-emitting element 120 is disposed, as shown in FIG. 2, or may be formed only between the active area and the pad area. When the pad area is disposed at one side of the substrate 111, the at least one dam 104 is disposed only on the one side of the substrate 111. When the pad area is disposed at opposite sides of the substrate 111, the at least one dam 104 is disposed on the opposite sides of the substrate 111. The at least one dam 104 is formed in a single-layered or multi-layered structure. The at least one dam 104 is formed simultaneously with at least one of the pixel planarization layer 118, the bank 128, and the spacer and is made of the same material.

The second inorganic encapsulation layer 146 is formed on the substrate 111, on which the organic encapsulation layer 144 has been formed, so as to cover the top and side surfaces of each of the organic encapsulation layer 144 and the first inorganic encapsulation layer 142. Accordingly, the second inorganic encapsulation layer 146 minimizes or prevents permeation of external moisture or oxygen into the first inorganic encapsulation layer 142 and the organic encapsulation layer 144. The second inorganic encapsulation layer 146 is formed of an inorganic insulating material, such as silicon nitride (SiNx), silicon oxide (SiOx), silicon oxynitride (SiON), or aluminum oxide ($Al_2O_3$).

A touch sensor Cm is disposed on the encapsulation unit 140. The touch sensor Cm includes a touch insulating film 156, and further includes a touch-sensing line 154 and a touch-driving line 152 disposed so as to intersect each other, with the touch insulating film 156 interposed therebetween. The touch sensor Cm charges an electric charge using a touch-driving pulse supplied to the touch-driving line 152, and discharges the electric charge to the touch-sensing line 154.

The touch-driving line 152 includes a plurality of first touch electrodes 152e and first bridges 152b electrically connecting the first touch electrodes 152e to each other.

The first touch electrodes 152e are spaced apart from each other at regular intervals in an X direction, which is a first direction, on the touch insulating film 156. Each of the first touch electrodes 152e is electrically connected to a neighboring first touch electrode 152e via the first bridge 152b.

The first bridge 152b is exposed through a touch contact hole 158 that penetrates the touch insulating film 156, and is electrically connected to the first touch electrode 152e.

The touch-sensing line 154 includes a plurality of second touch electrodes 154e and second bridges 154b electrically connecting the second touch electrodes 154e to each other.

The second touch electrodes 154e are spaced apart from each other at regular intervals in a Y direction, which is a second direction, on the touch insulating film 156. Each of the second touch electrodes 154e is electrically connected to a neighboring second touch electrode 154e via the second bridge 154b.

The second bridge 154b is disposed on the touch insulating film 156, which is coplanar with the second touch electrode 154e, and thus is electrically connected to the second touch electrode 154e without a separate contact hole.

A touch buffer film 148 may be disposed between each of the touch-driving line 152 and the touch-sensing line 154 and the encapsulation unit 140. Since the spacing distance between each of the touch-driving line 152 and the touch-sensing line 154 and the cathode 126 is increased by the touch buffer film 148, the capacitance value of a parasitic capacitor between each of the touch-driving line 152 and the touch-sensing line 154 and the cathode 126 may be reduced.

The first and second touch electrodes 152e and 154e and the first and second bridges 152b and 154b are formed in a mesh type such that they do not overlap the emission area of each subpixel SP and overlap the bank 128. Accordingly, it is possible to prevent an aperture ratio and transmissivity from being deteriorated by the first and second touch electrodes 152e and 154e and the first and second bridges 152b and 154b.

The first and second touch electrodes 152e and 154e and the first and second bridges 152b and 154b have higher conductivity than a transparent conductive film, and thus are formed as low-resistance electrodes. The first and second touch electrodes 152e and 154e and the first and second bridges 152b and 154b are formed in a single-layered or multi-layered structure together with routing lines 150 using a touch metal layer formed of a material having high corrosion resistance and acid resistance and excellent conductivity, such as Ta, Ti, Cu, or Mo. For example, the first and second touch electrodes 152e and 154e, the first and second bridges 152b and 154b, and the routing lines 150 are formed in a three-layered structure such as a stack of Ti/Al/Ti, MoTi/Cu/MoTi, or Ti/Al/Mo. Accordingly, the resistance and capacitance of each of the first and second touch electrodes 152e and 154e, the first and second bridges 152b and 154b, and the routing lines 150 are reduced. As a result, an RC delay is reduced, thus improving touch sensitivity.

According to the present disclosure, each of the touch-driving line 152 and the touch-sensing line 154 is connected to a touch-driving unit (not shown) via the routing line 150 and the touch pad 170.

The routing line 150 transmits a touch-driving pulse generated in the touch-driving unit to the touch-driving line 152 through the touch pad 170, and transmits a touch signal from the touch-sensing line 154 to the touch-driving unit through the touch pad 170. Accordingly, the routing line 150 is formed between each of the first and second touch electrodes 152e and 154e and the touch pad 170 to electrically connect each of the first and second touch electrodes 152e and 154e to the touch pad 170.

As shown in FIG. 2, the routing line 150 extends from the first touch electrode 152e to at least one of the left side and the right side of the active area, and is connected to the touch pad 170. In addition, the routing line 150 extends from the second touch electrode 154e to at least one of the upper side and the lower side of the active area, and is connected to the touch pad 170. This arrangement of the routing line 150 may be variously changed depending on the design requirements of the display device.

The routing line 150 is disposed on at least one of the touch buffer film 148 and the inorganic encapsulation layers 142 and 146 so as to extend along the side surface of at least one of the touch buffer film 148 and the inorganic encapsulation layers 142 and 146.

The touch pad 170 is connected to a signal transmission film (not shown), on which the touch-driving unit is mounted. The touch pad 170 is composed of first and second touch pad electrodes 172 and 174.

The first touch pad electrode 172 is disposed on at least one of the substrate 111, the buffer layer 112, and the interlayer insulating film 114, which is disposed below the encapsulation unit 140. The first touch pad electrode 172 is formed of the same material as at least one of a gate electrode 132, a source electrode 136, and a drain electrode 138 of a driving transistor T2 (130) in the same plane, and has a single-layered or multi-layered structure. For example, since the first touch pad electrode 172 is formed of the same material as the source and drain electrodes 136 and 138 and is disposed on the interlayer insulating film 114, the first touch pad electrode 172 is formed through the same mask process as the source and drain electrodes 136 and 138.

The first touch pad electrode 172 is electrically connected to the routing line 150 via first and second touch auxiliary electrodes 192 and 194. The first touch auxiliary electrode 192 is exposed through a touch auxiliary hole 198a that penetrates the touch buffer film 148 and the touch insulating film 156, and is in contact with the routing line 150. The first touch auxiliary electrode 192 is formed of the same material as the first touch pad electrode 172 and is disposed in the same plane. The second touch auxiliary electrode 194 is exposed through a second touch auxiliary hole 198b that penetrates the interlayer insulating film 114, and is in contact with the first touch auxiliary electrode 192. Further, the second touch auxiliary electrode 194 is exposed through a third touch auxiliary hole 198c that penetrates the second interlayer insulating film 114, and is in contact with the first touch pad electrode 172. The second touch auxiliary electrode 194 is disposed in the same plane as the gate electrode 132 and is made of the same material.

The second touch pad electrode 174 is electrically connected to the first touch pad electrode 172, which is exposed through a touch pad contact hole 176 that penetrates the touch buffer film 148 and the touch insulating film 156. Since the second touch pad electrode 174 is formed through the same mask process as the routing line 150, the second touch pad electrode 174 is formed of the same material as the routing line 150 in the same plane.

The second touch pad electrode 174 extends from the routing line 150, and is connected to a signal transmission film (not shown), on which the touch-driving unit is mounted, via an anisotropic conductive film (not shown).

The display pad 108 and the power pads 160A and 160B are disposed together in a non-active area (a bezel), in which the touch pad 170 is disposed. For example, as shown in FIG. 2, the display pads 108 may be disposed between touch pads 170, or the touch pads 170 may be disposed between the display pads 108. Alternatively, the touch pad 170 may be disposed at one side of the display panel, and the display pad 108 may be disposed at the opposite side of the display panel. However, the arrangement of the touch pad 170 and the display pad 108 is not limited to the structure shown in FIG. 2, and may be variously changed depending on the design requirements of the display device. The display pad 108 is connected to at least one of the scan line and the data line. The display pad 108 is formed in a stack structure different from that of the touch pad 170, or is formed in the same stack structure as the touch pad 170.

Figure 4:
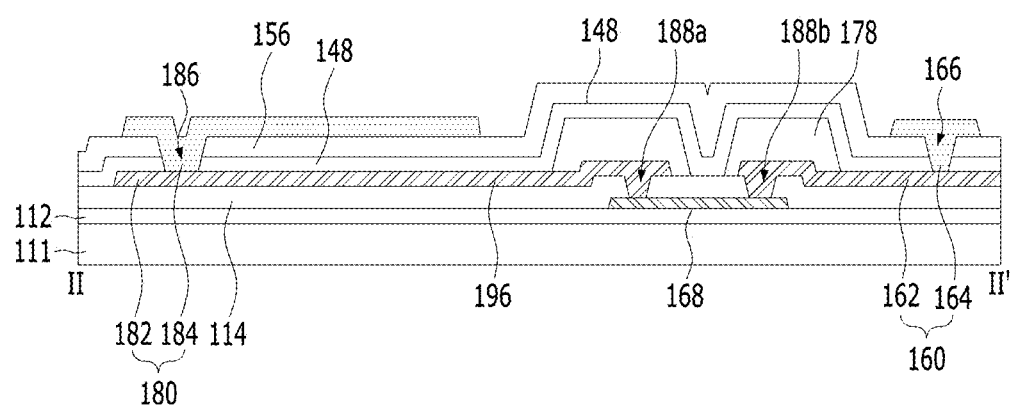
FIG. 4 is a cross-sectional view of the touch display device taken along line II-IF in FIG. 2.

A plurality of power pads 160A and 160B is connected to a driving signal line 180 that supplies low-potential voltage VSS or high-potential voltage VDD. For example, the power pads include a first power pad 160A disposed on one side of the substrate 111 and a second power pad 160B disposed on the opposite side of the substrate 111. Each of the first and second power pads 160A and 160B includes first and second power pad electrodes 162 and 164, as the power pad 160 shown in FIG. 4.

The first power pad electrode 162 is disposed on at least one of the substrate 111, the buffer layer 112, and the interlayer insulating film 114, which is disposed below the encapsulation unit 140. The first power pad electrode 162 is formed in a single-layered or multi-layered structure in the same plane as the first touch pad electrode 172 using the same material.

The first power pad electrode 162 is electrically connected to the driving signal line 180 via first and second power auxiliary electrodes 196 and 168.

The first power auxiliary electrode 196 extends from the first driving signal line 182 of the driving signal line 180. The first power auxiliary electrode 196 is disposed in the same plane as the first touch pad electrode 172 and is made of the same material.

The second power auxiliary electrode 168 is exposed through a first power auxiliary hole 188a that penetrates the interlayer insulating film 114, and is in contact with the first power auxiliary electrode 196. In addition, the second power auxiliary electrode 168 is exposed through a second power auxiliary hole 188b that penetrates the interlayer insulating film 114, and is in contact with the first power pad electrode 162. The second power auxiliary electrode 168 is disposed in the same plane as the gate electrode 132 and is made of the same material.

The second power pad electrode 164 is electrically connected to the first power pad electrode 162, which is exposed through a power buffer contact hole 166 that penetrates the touch buffer film 148 and the touch insulating film 156. Since the second power pad electrode 164 is formed through the same mask process as the routing line 150, the second power pad electrode 164 is formed in the same plane as the routing line 150 and is made of the same material.

Figure 5:
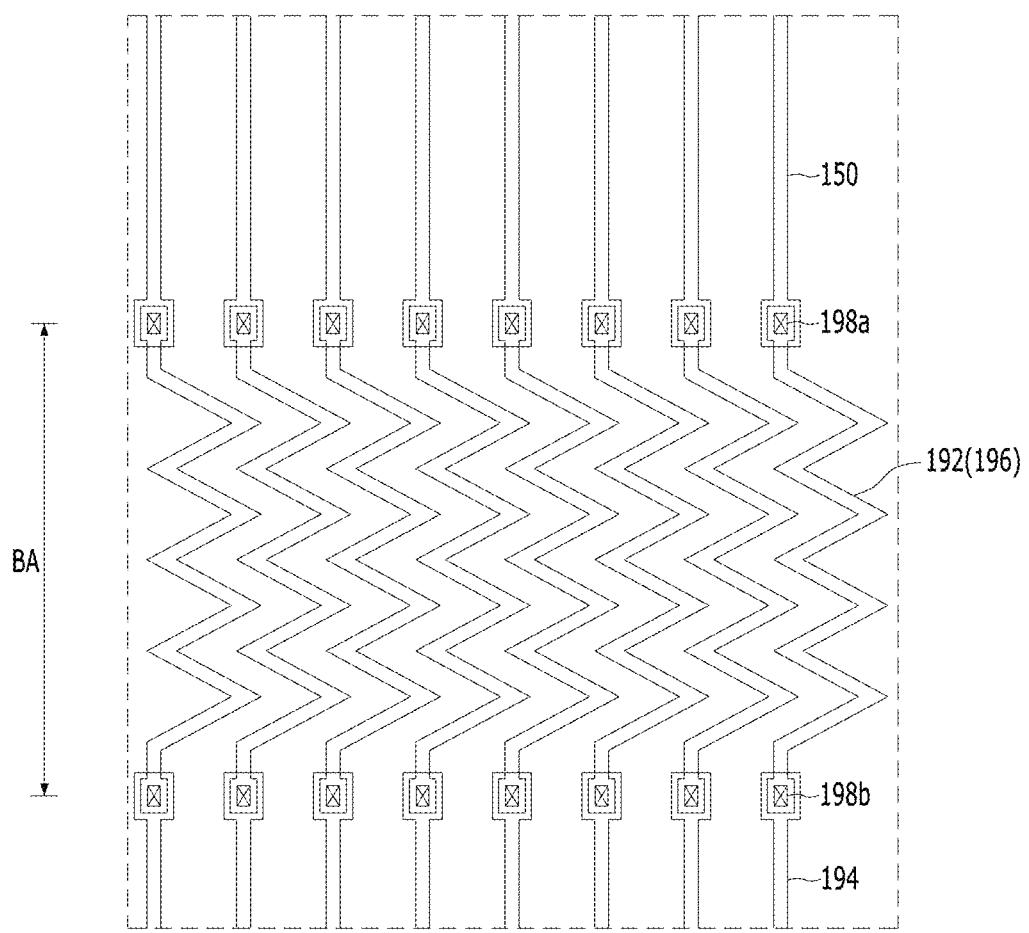
FIG. 5 is a plan view showing a bending area of the touch display device according to the present disclosure.

As shown in FIG. 5, a bending area BA for bending or folding the substrate 111 is included in the non-active area, in which the power pads 160A and 160B, the touch pad 170 and the display pad 108 are disposed. The first power auxiliary electrode 196 and the first touch auxiliary electrode 192, which are disposed in the bending area BA, are disposed in a zigzag shape, or are disposed such that multiple hollow polygonal-shaped unit structures, multiple hollow circular-shaped unit structures, or combinations thereof are connected to each other in a row. Accordingly, it is possible to minimize damage to the first power auxiliary electrode 196 and the first touch auxiliary electrode 192 even when external force is applied thereto due to the curvature of the bending area BA.

A crack prevention layer 178 is disposed in the bending area BA so that the bending area BA is easily bent. The crack prevention layer 178 is formed on the first power auxiliary electrode 196 and on the first touch auxiliary electrode 192 using an organic insulating material having a higher strain rate and higher impact resistance than the inorganic insulating film. For example, since the crack prevention layer 178 is formed together with at least one of the pixel planarization layer 118 and the bank 128, the crack prevention layer 178 is disposed in the same plane as at least one of the pixel planarization layer 118 and the bank 128 and is made of the same material. The crack prevention layer 178, which is formed of an organic insulating material, has a higher strain rate than the inorganic insulating material and thus alleviates bending stress caused by bending of the substrate 111. Accordingly, the crack prevention layer 178 is capable of preventing cracking of the bending area BA, thus preventing cracks from spreading to the active area AA.

Figure 6:
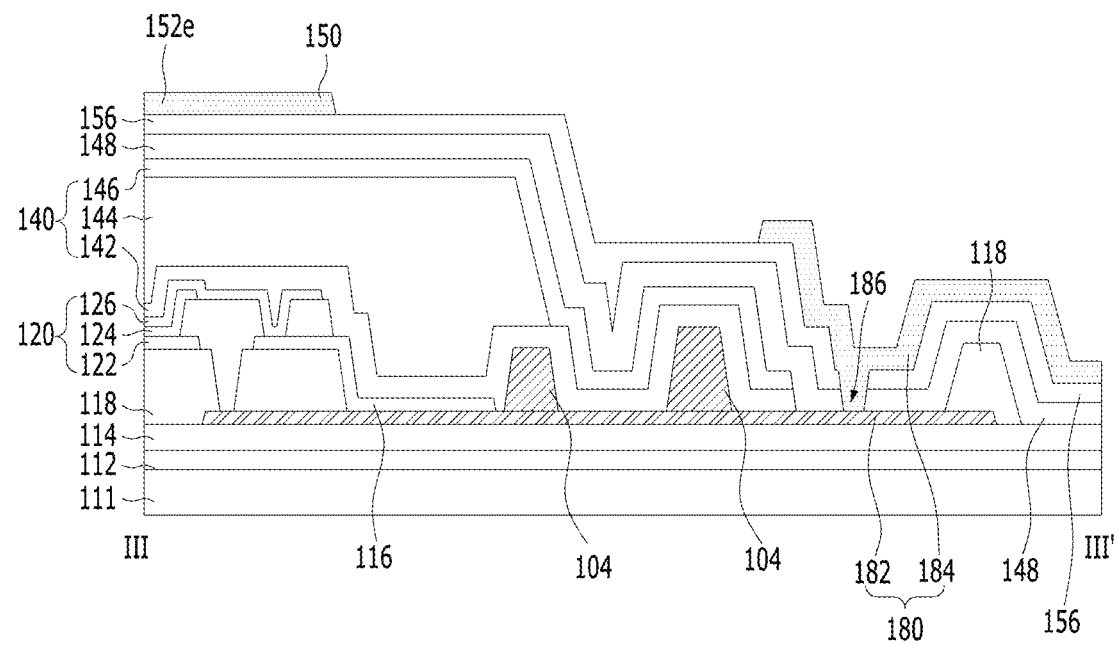
FIG. 6 is a cross-sectional view of the touch display device taken along line in FIG. 2.

According to the present disclosure, the driving signal line 180 connected to the power pads 160A and 160B is disposed in the left and right bezel areas, which are disposed outside the dam 104, or is also disposed in the upper bezel area, which is disposed outside the dam 104, as well as the left and right bezel areas. For example, as shown in FIG. 2, the driving signal line 180 is formed in a U shape so as to surround the areas other than the pad area in which the power pads 160A and 160B, the touch pad 170 and the display pad 108 are disposed. As shown in FIG. 6, the driving signal line 180 includes first and second driving signal lines 182 and 184. The first and second driving signal lines 182 and 184 are formed to have no empty space therein, or are formed to have at least one slit therein.

The first driving signal line 182 is formed together with the first conductive layer of at least one of the gate electrode 132, the source electrode 136, the drain electrode 138, the anode 122, and the cathode 126, which is disposed below the encapsulation unit 140. For example, since the first driving signal line 182 is formed together with the source and drain electrodes 136 and 138, the first driving signal line 182 is formed on the interlayer insulating film 114 and is made of the same material as the source and drain electrodes 136 and 138. When the driving signal line 180 supplies low-potential voltage VSS to the cathode 126 of the light-emitting element 120, the first driving signal line 182 is connected to the cathode 126 via a pixel connection electrode 116. In this case, the pixel connection electrode 116 is formed in the same plane as the anode 122 and is made of the same material.

The second driving signal line 184 is formed together with the second conductive layer of at least one of the touch electrodes 152e and 154e and the first bridge 152b, which is disposed above the encapsulation unit 140. For example, since the second driving signal line 184 is formed together with the touch electrodes 152e and 154e, the second driving signal line 184 is formed on the touch insulating film 156 and is made of the same material as the touch electrodes 152e and 154e.

The second driving signal line 184 is electrically connected to the first driving signal line 182, which is exposed through a plurality of power contact holes 186 that penetrate the touch buffer film 148 and the touch insulating film 156. In this case, the first and second driving signal lines 182 and 184 are connected to each other through the power contact holes 186 in the area outside the dam 104, in which the organic encapsulation layer 140 is not disposed. Accordingly, since the power contact holes 186 are formed so as to penetrate the touch buffer film 148 and the touch insulating film 156, which are thinner than the organic encapsulation layer 140, the process of forming the power contact holes 186 is facilitated.

Figure 7:
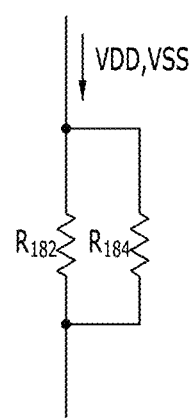
FIG. 7 is a circuit diagram showing the connection relationship between the first and second driving signal lines shown in FIG. 6.

As described above, according to the present disclosure, as shown in FIG. 7, the driving signal line 180, which supplies at least one of the high-potential voltage VDD and the low-potential voltage VSS, is formed in a multi-layered parallel connection structure. Accordingly, compared to a driving signal line having a single-layered structure, the driving signal line 180 of the present disclosure is capable of reducing line resistances R182 and R184. Accordingly, the present disclosure is capable of preventing a drop in high-potential voltage VDD or low-potential voltage VSS, thereby reducing variation in luminance attributable to such a voltage drop.

In addition, if the driving signal line 180 having a multi-layered structure, which includes the first and second driving signal lines 182 and 184, is designed to have a resistance level equivalent to that of a driving signal line having a single-layered structure, the line width of the driving signal line 180 having a multi-layered structure may be reduced, thus realizing a narrow bezel.

Figure 8:
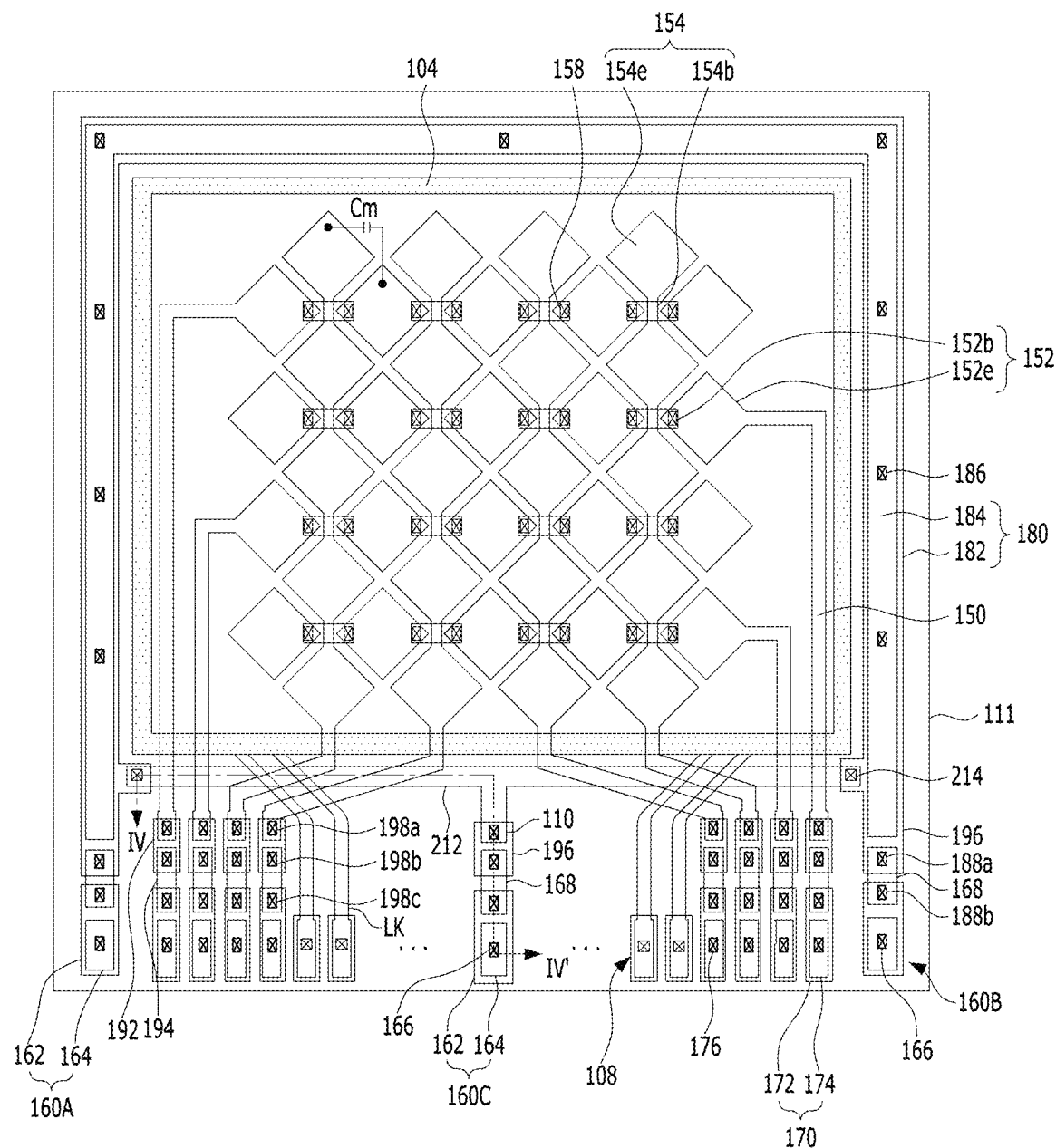
FIG. 8 is a plan view showing a touch display device according to a second aspect of the present disclosure.
Figure 9:
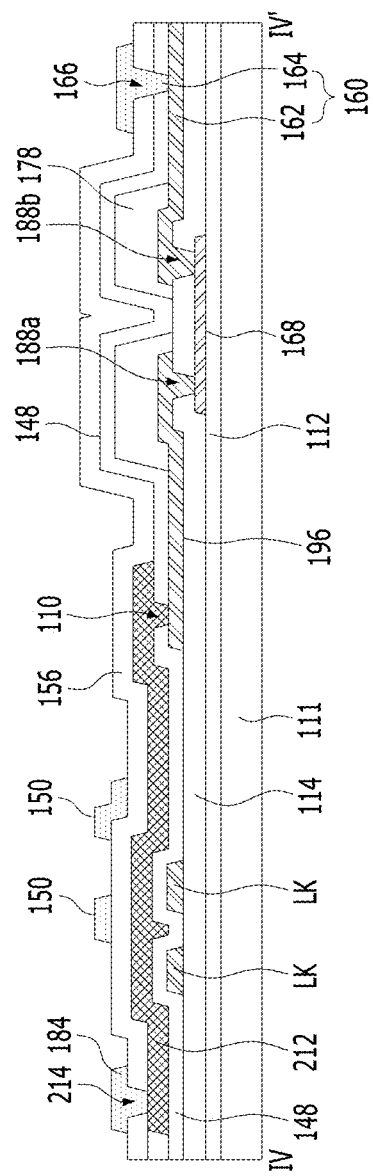
FIG. 9 is a cross-sectional view of the touch display device taken along line IV-IV' in FIG. 8.
Figure 10:
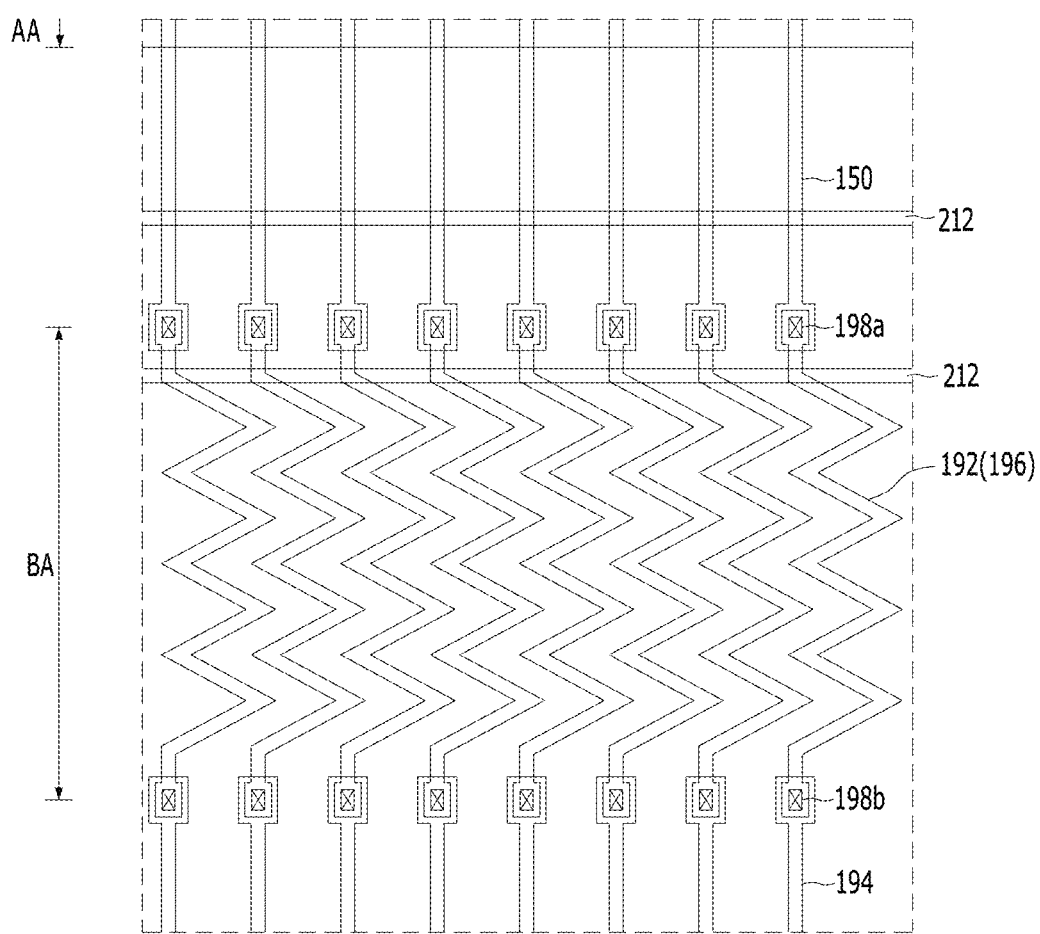
FIG. 10 is a plan view showing an area in which the third driving signal line shown in FIG. 9 is disposed.

FIG. 8 is a plan view showing a touch display device according to a second aspect of the present disclosure, and FIG. 9 is a cross-sectional view of the touch display device taken along line IV-IV' in FIG. 8.

The touch display device shown in FIGS. 8 and 9 has the same components as the touch display device according to the first aspect, except that a third power pad 160C of the power pad 160 and a third driving signal line 212 are further included. Therefore, a detailed description of the same components will be omitted.

The third power pad 160C is disposed between the first and second power pads 160A and 160B, and is further disposed between the display pads 108 or between the touch pads 170. The third power pad 160C has the same stack structure as the first and second power pads 160A and 160B, and is connected to the third driving signal line 212 via the first and second power auxiliary electrodes 196 and 168.

Figure 11:
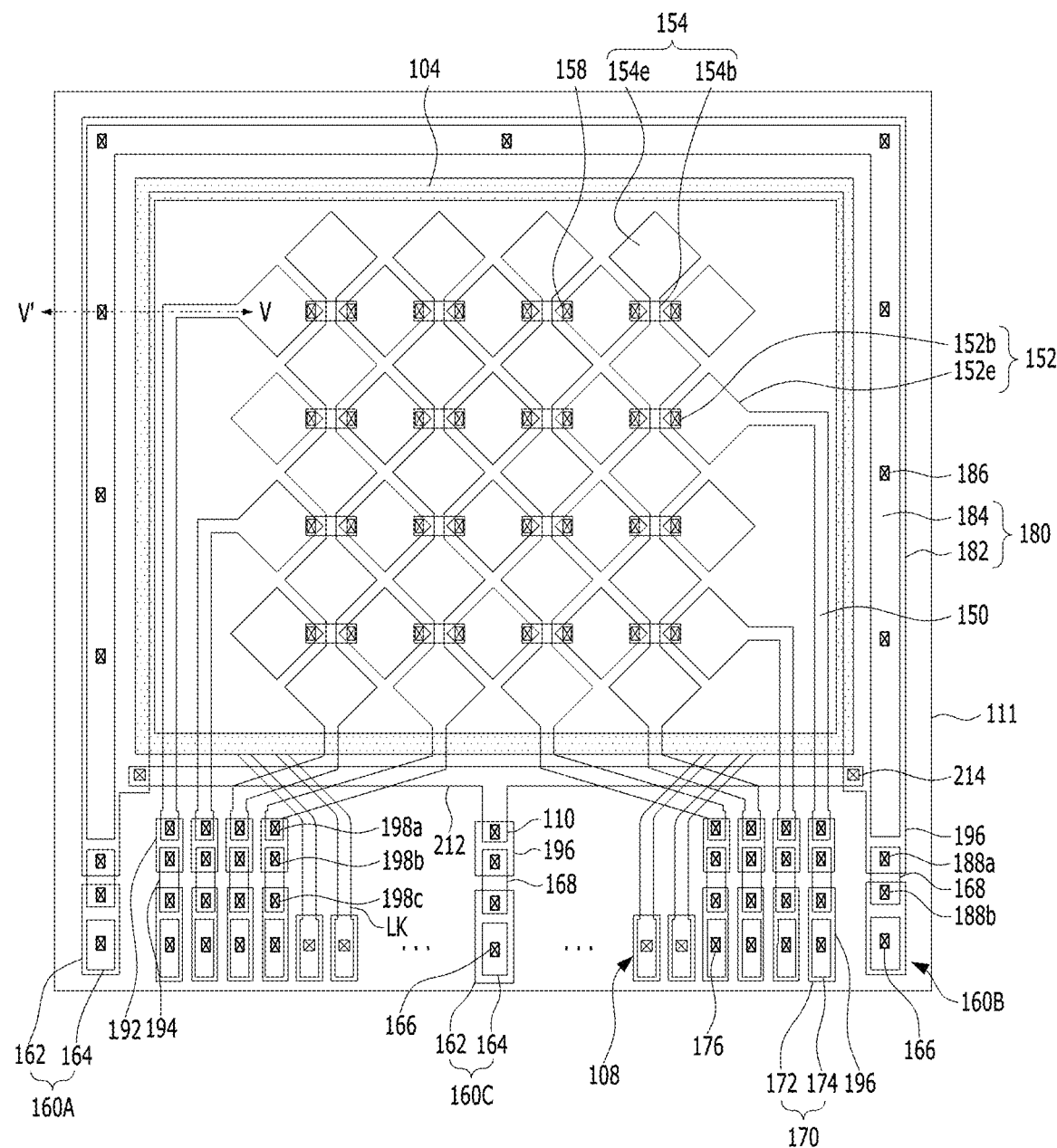
FIG. 11 is a plan view showing a touch display device according to a third aspect of the present disclosure.

As shown in FIG. 11, at least one third driving signal line 212 is formed in at least a portion of the bending area BA, is disposed in the non-active area between the bending area BA and the active area AA, or is disposed both in the non-active area between the bending area BA and the active area AA and in the bending area BA. In this case, since the third driving signal line 212 intersects at least one of the display link LK, connected to the display pad 108, and the routing line 150, the third driving signal line 212 is prevented from being electrically short-circuited therewith. For example, the third driving signal line 212 is disposed so as to be insulated from the display link LK, with the touch buffer film 148 interposed therebetween, and is disposed so as to be insulated from the routing line 150, with the touch insulating film 156 interposed therebetween. In this case, the third driving signal line 212 is disposed on the touch buffer film 148 and is made of the same material as the first bridge 152b. The third driving signal line 212 is connected to the first power auxiliary electrode 196, which is exposed through a third power auxiliary hole 110 that penetrates the touch buffer film 148. In addition, the third driving signal line 212 is connected to the second driving signal line 184, which is exposed through a fourth power auxiliary hole 214 that penetrates the touch buffer film 148.

As described above, the display device according to the present disclosure is capable of supplying at least one of high-potential voltage VDD and low-potential voltage VSS to the driving signal lines 182, 184 and 212 through the first to third power pads 160A, 160B and 160C. Accordingly, the present disclosure is capable of supplying driving voltage through each of the first to third power pads 160A, 160B and 160C, thereby stably supplying the driving voltage.

In addition, according to the present disclosure, the driving signal line 180 for supplying at least one of high-potential voltage VDD and low-potential voltage VSS is formed in a multi-layered structure, thereby reducing line resistance compared to a driving signal line having a single-layered structure. Accordingly, the present disclosure is capable of preventing a drop in high-potential voltage VDD or low-potential voltage VSS, thereby reducing variation in luminance attributable to such a voltage drop.

In addition, if the driving signal line having a multi-layered structure, which includes the first to third driving signal lines 182, 184 and 212, is designed to have a resistance level equivalent to that of a driving signal line having a single-layered structure, the total line width of the driving signal line 180 may be reduced, thus realizing a narrow bezel.

Figure 12:
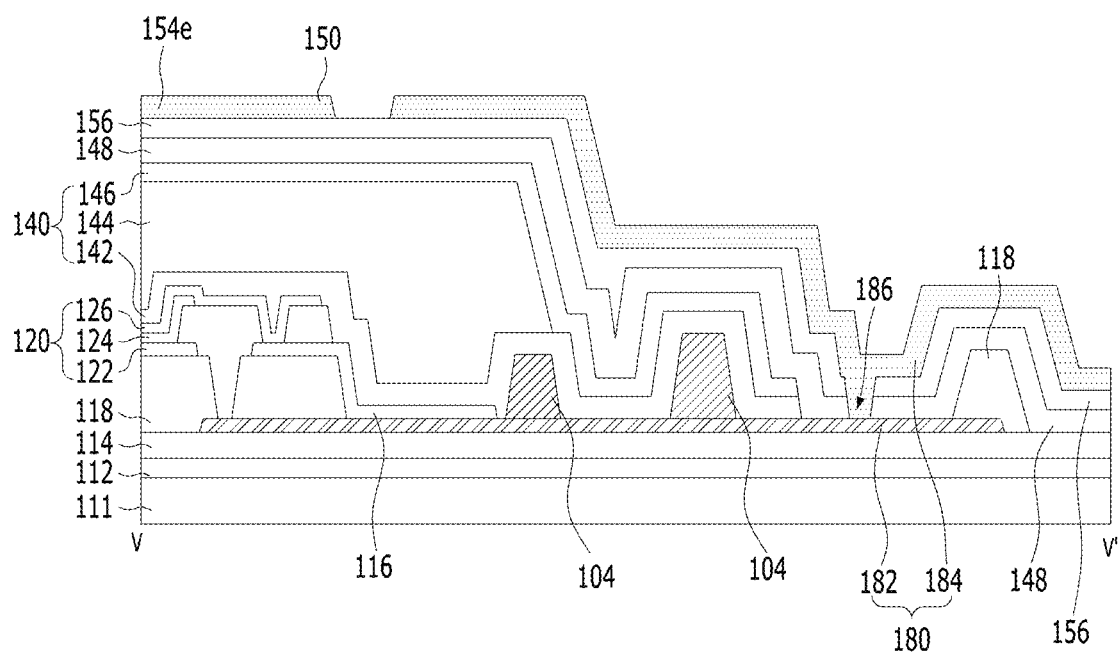
FIG. 12 is a cross-sectional view of the touch display device taken along line V-V' in FIG. 11.

FIG. 11 is a plan view showing a touch display device according to a third aspect of the present disclosure, and FIG. 12 is a cross-sectional view of the touch display device taken along line V-V' in FIG. 11.

The touch display device shown in FIGS. 11 and 12 has the same components as the touch display device according to the second aspect, except that at least one of first to third driving signal lines 182, 184 and 212 is disposed so as to overlap at least a portion of the dam 104. Therefore, a detailed description of the same components will be omitted.

At least one of the first to third driving signal lines 182, 184 and 212 is disposed so as to overlap at least a portion of the dam 104 in an area between the edge of the substrate 111 and the dam 104. Accordingly, the areas of the driving signal lines 182, 184 and 212 are increased, thereby reducing the resistance values of the driving signal lines 182, 184 and 212.

In addition, according to the present disclosure, the driving signal line 180 is formed in a multi-layered structure, thereby reducing line resistance compared to a driving signal line having a single-layered structure. Accordingly, the present disclosure is capable of preventing a drop in high-potential voltage VDD or low-potential voltage VSS, thereby reducing variation in luminance attributable to such a voltage drop.

In addition, if the driving signal line having a multi-layered structure, which includes the first to third driving signal lines 182, 184 and 212, is designed to have a resistance level equivalent to that of a driving signal line having a single-layered structure, the total line width of the driving signal line 180 may be reduced, thus realizing a narrow bezel.

Figure 13A:
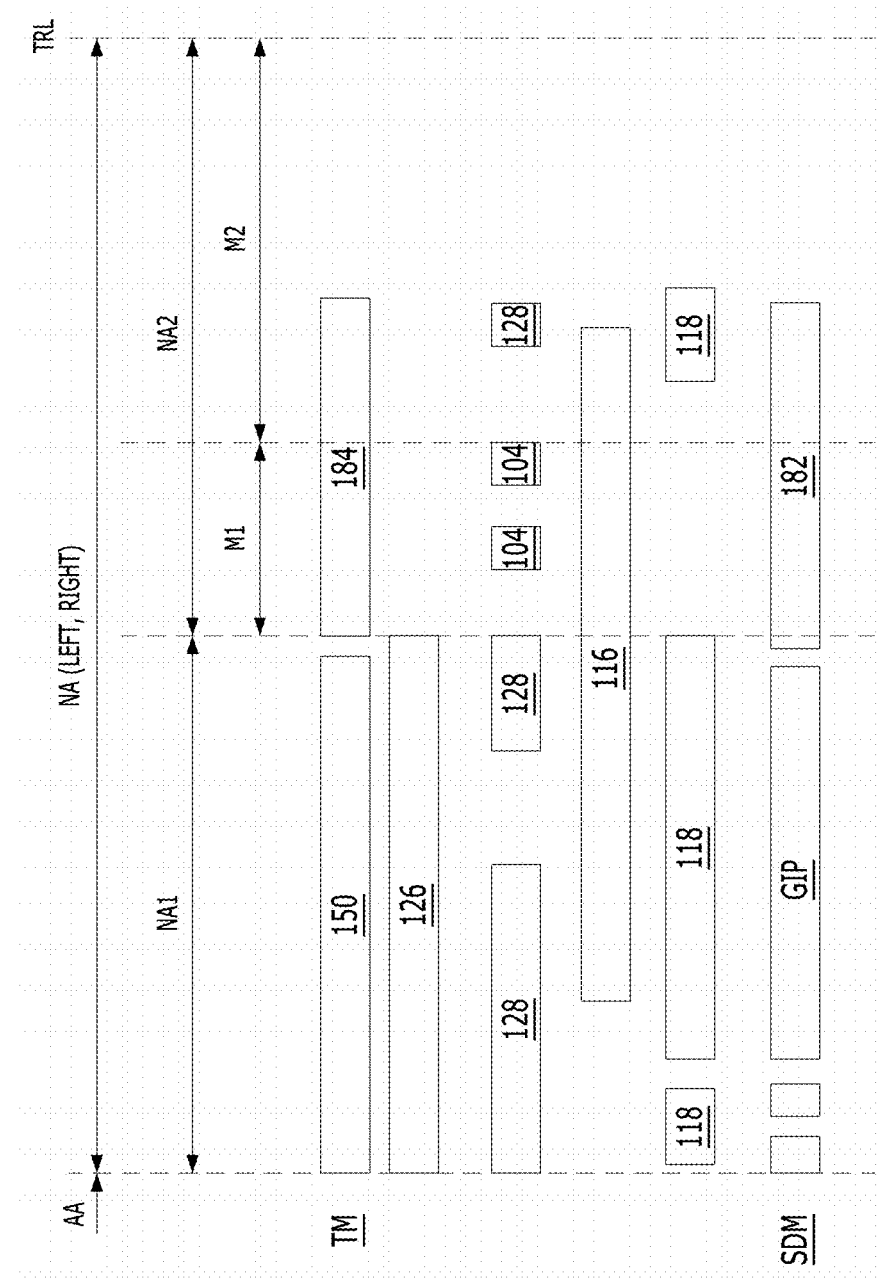
FIGS. 13A and 13B are cross-sectional views showing an area in which the diving signal line according to the present disclosure is disposed in detail.
Figure 13B:
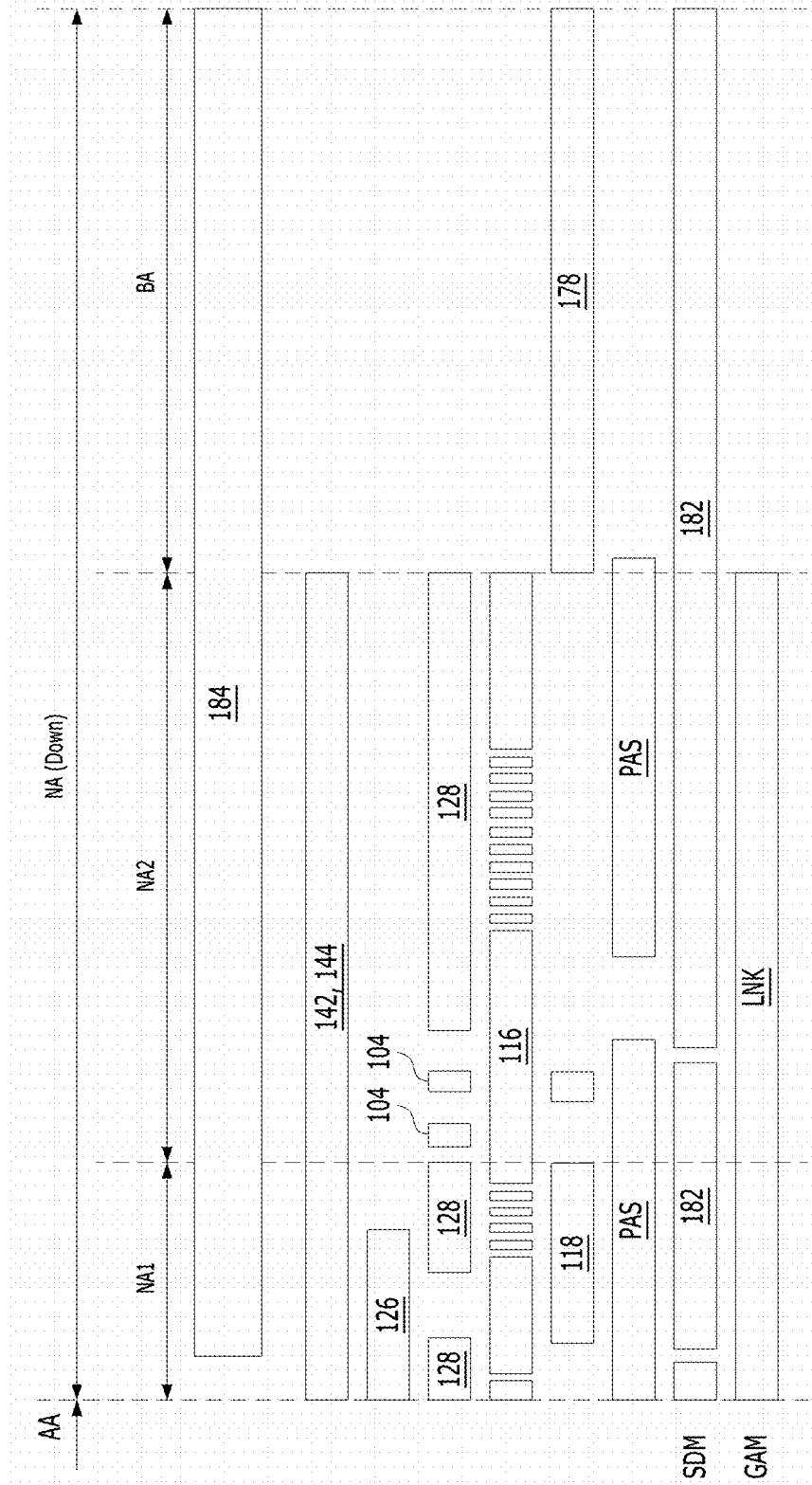

The driving signal line of the touch display device according to the present disclosure is disposed in the non-active area NA, as shown in FIGS. 13A and 13B.

As shown in FIG. 13A, the non-active area NA, which is disposed on the left and right of the active area AA, includes first and second non-active areas NA1 and NA2, which are disposed between the active area AA and a trimming line TRL, which is the edge of the substrate 111. As shown in FIG. 13A, the first and second driving signal lines 182 and 184 are disposed in the second non-active area NA2, which is disposed on the left and right of the active area AA. In particular, the first and second driving signal lines 182 and 184 are disposed in a margin area M1 of the organic encapsulation layer 144 and a margin area M2 of the inorganic encapsulation layers 142 and 146, which are included in the second non-active area NA2. The first driving signal line 182 is formed as source and drain metal layers SDM between the gate-driving circuit GIP and the trimming line TRL, and the second driving signal line 184 is formed as a touch metal layer TM between the routing line 150 and the trimming line TRL.

The non-active area NA, which is disposed below the active area AA, is an area to which the signal transmission film, on which the driving circuit is mounted, is attached, and, as shown in FIG. 13B, includes a bezel area BA as well as first and second non-active areas NA1 and NA2.

The first and second driving signal lines 182 and 184 are disposed in the first and second non-active areas NA1 and NA2 and the bezel area BA, which are disposed below the active area AA. The first and second driving signal lines 182 and 184 overlap the signal link LNK, which is formed as a gate metal layer GAM, in the first and second non-active areas NA1 and NA2. The first driving signal line 182 may be in direct contact with the pixel planarization layer 118, as shown in FIG. 6. Alternatively, the first driving signal line 182 may overlap the pixel planarization layer 118, with a protective film PAS interposed therebetween.

Figure 14:
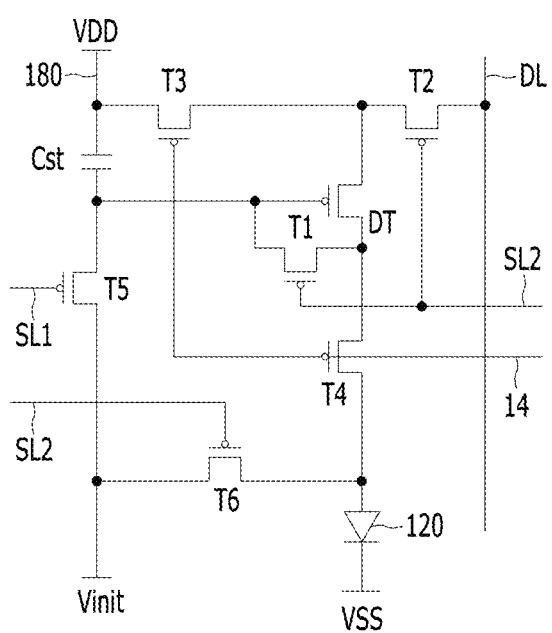
FIG. 14 is a circuit diagram showing another aspect of a pixel-driving circuit according to the present disclosure.

Although the present disclosure has been described by way of example as having a structure in which the pixel circuit includes two transistors T and one capacitor C, the present disclosure is not limited thereto. As shown in FIG. 14, the present disclosure may have a 7T1C structure in which the pixel circuit includes seven or more transistors T1, T2, T3, T4, T5, T6 and DT, which are connected to scan lines SL1 and SL2 or an emission control line 14, and one or more capacitors Cst.

The source electrode of the driving transistor DT of the pixel circuit is electrically connected to the driving signal line 180, which supplies high-potential voltage VDD. Accordingly, the potential difference Vgs between the gate and the source of the driving transistor DT varies according to a change in high-potential voltage due to the line resistance of the driving signal line 180 supplying the high-potential voltage VDD. Further, the amount of current flowing through the light-emitting element 120 varies according to the potential difference Vgs between the gate and the source of the driving transistor DT, and thus the luminance varies. In addition, the image quality is affected by variation in initialization voltage Vinit and low-potential voltage VSS as well as high-potential voltage VDD connected to the driving transistor DT. Therefore, according to the present disclosure, the driving signal lines 180 for supplying initialization voltage Vinit and low-potential voltage VSS as well as the driving signal line 180 for supplying high-potential voltage VDD are formed in a multi-layered structure using at least one first conductive layer, which is disposed below the encapsulation unit 140, and at least one second conductive layer, which is disposed above the encapsulation unit 140. Accordingly, the present disclosure is capable of reducing the line resistance values of the driving signal lines 180 that supply high-potential voltage VDD, initialization voltage Vinit, and low-potential voltage VSS.

Figure 15A:
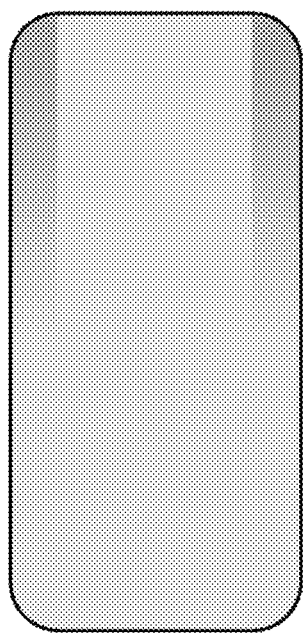
FIGS. 15A and 15B are views showing image quality of a touch display device according to a comparative example and image quality of the touch display device according to the aspect of the present disclosure.
Figure 15B:
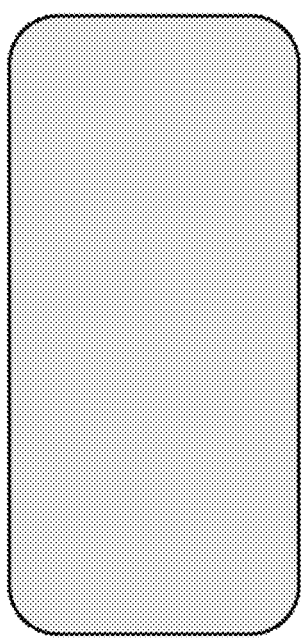

Although the touch display device according to the present disclosure has been described by way of example as having a rectangular structure, the present disclosure may also be applied to various other structures, such as a circular structure, an elliptical structure, a polygonal structure having at least one inclined surface, or an irregularly shaped structure having at least one rounded surface. Since the touch display device having an irregularly shaped structure includes a corner portion having a reduced area compared to the touch display device having a rectangular structure, the area in which a driving signal line is formed is reduced, leading to variation in line resistance. Accordingly, due to the difference in line resistance between the region in which the corner portion is disposed and the region other than the corner portion, as shown in FIG. 15A, a difference in luminance between the region in which the corner portion is disposed and the region other than the corner portion occurs, leading to block dim. In order to solve this problem, according to the present disclosure, the driving signal line 180 is formed in a multi-layered structure using at least one first conductive layer disposed below the encapsulation unit 140 and at least one second conductive layer disposed above the encapsulation unit 140. Accordingly, the present disclosure is capable of reducing the line resistance of the driving signal line 180. As a result, as shown in FIG. 15B, the present disclosure is capable of improving image quality by reducing the difference in luminance between the region in which the corner portion is disposed and the region other than the corner portion.

Although the present disclosure has been described by way of example as having a mutual-capacitance-type touch sensor structure, the present disclosure is not limited thereto. The present disclosure can also be applied to a self-capacitance-type touch sensor structure. That is, each of the plurality of touch electrodes includes a capacitance formed therein, and thus is used as a self-capacitance-type touch sensor that senses variation in capacitance due to a user touch. Each of the touch electrodes is connected to a respective one of the routing lines in one-to-one correspondence. Each of the touch electrodes is electrically connected to a corresponding one of the routing lines, and is not connected to the remaining routing lines. For example, the $m^{th}$ touch electrode (where "m" is a natural number) is electrically connected to the $m^{th}$ routing line, and is not connected to the remaining routing lines other than the m$^{th}$ routing line. The m+1$^{th}$ touch electrode is electrically connected to the m+1$^{th}$ routing line, and is not connected to the remaining routing lines other than the m+1$^{th}$ routing line. In this case, the routing lines may be disposed across the touch electrodes, or may be disposed between the touch electrodes. The routing lines are disposed in a different layer from the touch electrodes, with the touch insulating film interposed therebetween, and thus are electrically connected to the touch electrodes through the contact holes, which penetrate the touch insulating film. Alternatively, the routing lines may be disposed in the same layer as the touch electrodes, and thus may be directly connected to the touch electrodes without separate contact holes.

As is apparent from the above description, in a touch display device according to the present disclosure, a driving signal line is formed in a multi-layered parallel connection structure. Accordingly, the driving signal line of the present disclosure is capable of reducing line resistance compared to a driving signal line having a single-layered structure. As a result, the present disclosure is capable of preventing a drop in high-potential voltage or low-potential voltage, thereby reducing variation in luminance attributable to such a voltage drop.

In addition, if the driving signal line having a multi-layered structure is designed to have a resistance level equivalent to that of a driving signal line having a single-layered structure, the line width of the driving signal line having a multi-layered structure may be reduced, thus realizing a narrow bezel.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A touch display device comprising:
    a substrate including an active area and a bezel area adjacent to the active area;
    a light-emitting element on the substrate;
    an encapsulation unit on the light-emitting element;
    a plurality of touch sensors on the encapsulation unit; and
    a first signal line in the bezel area, the first signal line disposed below the encapsulation unit;
    a second signal line in the bezel area, the second signal line electrically connected to the first signal line and disposed on the encapsulation unit; and
    a touch insulating film between the first signal line and the second signal line,
    wherein, in the bezel area, the first signal line and the second signal lines overlap each other with the touch insulating film interposed therebetween; and
    wherein the first signal line is a low-potential voltage line supplying low-potential voltage to the light-emitting element.

2. The touch display device according to claim 1, wherein the plurality of touch sensors comprising:
    a plurality of first touch electrodes arranged in a first direction;
    a plurality of second touch electrodes arranged in a second direction intersecting the first direction; and
    a first bridge electrically connecting the plurality of first touch electrodes to each other,
    wherein the touch insulating film is disposed between the plurality of the first and second touch electrodes and the first bridge.

3. The touch display device according to claim 2, further comprising a driving transistor connected to the light-emitting element,
    wherein the driving transistor includes a gate electrode, a source electrode and a drain electrode.

4. The touch display device according to claim 3, wherein the first signal line is formed of a same material as at least one of the gate electrode, the source electrode and the drain electrode of the driving transistor and is disposed in a same plane as at least one of the gate electrode, the source electrode, and the drain electrode of the driving transistor, and
    wherein the second signal line is formed of a same material as at least one of the plurality of the first touch electrodes, the plurality of second touch electrodes and the first bridge.

5. The touch display device according to claim 2, further comprising a touch buffer film on the encapsulation unit,
    wherein the touch buffer film is disposed between the encapsulation unit and the plurality of touch sensors.

6. The touch display device according to claim 5, wherein the touch buffer film is disposed between the encapsulation unit and the first bridge.

7. The touch display device according to claim 5, wherein the touch buffer film and the touch insulating film are disposed between the first signal line and the second signal line, and
    wherein, in the bezel area, the first signal line and the second signal lines overlap each other with the touch insulating film and the touch buffer film interposed therebetween.

8. The touch display device according to claim 5, wherein the first bridge is disposed on the touch buffer film, and
    the plurality of the first and second touch electrodes are disposed on the touch insulating film.

9. The touch display device according to claim 8, wherein the second signal line is formed of a same material as the plurality of the first and second touch electrodes.

* * * * *